(12) United States Patent
Kittenplon et al.

(10) Patent No.: US 12,725,439 B1
(45) Date of Patent: Sep. 1, 2026

(54) DOCUMENT IMAGE ANALYSIS USING JOINT PREDICTION OF LAYOUT ELEMENTS AND READING ORDER

(71) Applicant: Amazon Technologies, Inc., Seattle, WA (US)

(72) Inventors: Yair Kittenplon, Tel Aviv-Jaffa (IL); Niv Berchi Nayman, Shoham (IL); Alona Golts, Haifa (IL); Ron Litman, Tel-Avi (IL)

(73) Assignee: Amazon Technologies, Inc., Seattle, WA (US)

( * ) Notice: Subject to any disclaimer, the term of this patent is extended or adjusted under 35 U.S.C. 154(b) by 442 days.

(21) Appl. No.: 18/535,846

(22) Filed: Dec. 11, 2023

(51) Int. Cl.
*G06V 30/413* (2022.01)
*G06V 10/82* (2022.01)
*G06V 30/10* (2022.01)
*G06V 30/414* (2022.01)

(52) U.S. Cl.
CPC ............ *G06V 30/413* (2022.01); *G06V 10/82* (2022.01); *G06V 30/10* (2022.01); *G06V 30/414* (2022.01)

(58) Field of Classification Search
CPC .... G06V 30/10; G06V 30/413; G06V 30/414; G06V 10/82; G06F 16/93; G06F 18/24
See application file for complete search history.

(56) References Cited

U.S. PATENT DOCUMENTS 12,443,790 B2 * 10/2025 Nair ...................... G06F 40/103
2024/0257550 A1 * 8/2024 Rebecq ................ G06V 30/412

FOREIGN PATENT DOCUMENTS

CN 116092090 A * 5/2023 ............ G06V 30/18

OTHER PUBLICATIONS

Wang, et al. (LayoutReader: Pre-training of text and layout for reading order detection). (Year: 2021).*
Ma, et al. (Computer English Translation of Chinese Pat. No. CN116092090 A). (Year: 2023).*
Ross Girshick, et al., "Rich feature hierarchies for accurate object detection and semantic segmentation," Tech Report (v5), arXiv preprint: arXiv: 1311.2524v5, Oct. 22, 2014, pp. 1-21.
Nicolas Carion, et al., "End-to-End Object Detection with Transformers," arXiv preprint: arXiv:2005.12872v3, May 28, 2020, pp. 1-26.
Weihong Ma, et a., "Joing Layout Analysis, Character Detection and Recognition for Historical Document Digitization," arXiv preprint: arXiv:2007.06890v1, Jul. 14, 2020, pp. 1-6.

(Continued)

*Primary Examiner* — Daniel G Mariam
(74) *Attorney, Agent, or Firm* — Robert C. Kowert; Kowert, Hood, Munyon, Rankin & Goetzel, P.C.

(57) ABSTRACT

A labeled data set which indicates layout elements within document images, as well as a reading order for the layout elements, is obtained. Using the data set and a combined loss function, a machine learning model is trained to predict respective content classes of layout elements identified within document images, and reading orders for the layout elements. The combined loss function aggregates losses associated with prediction of the content classes and the reading order. In response to an inference request indicating a document image, an indication of a predicted reading order for layout elements identified in the document image is generated using the trained model.

20 Claims, 11 Drawing Sheets

(56) References Cited

OTHER PUBLICATIONS

Ze Liu, et al., “Swin Transformer: Hierarchical Vision Transformer Using Shifted Windows,” arXiv preprint: arXiv:2103.14030v2, Aug. 17, 2021, pp. 1-14.
Vacit Oguz Yazici, et al., “Visual Transformers with Primal Object Queries for Multi-Label Image Classification,” arXiv preprint: arXiv:2112.05485v2, May 15, 2022, pp. 1-7.
Hao Zhang, et al., “DINO: DETR with Improved DeNoising Anchor Boxes for End-to-End Object Detection,” arXiv preprint: arXiv:2203.03605v4, Jul. 11, 2022, pp. 1-23.
Birgit Pfitzmann, et al., “DocLayNet: A Large Human-Annotated Dataset for Document-Layout Analysis,” arXiv preprint: arXiv:2206.01062v1, Jun. 2, 2022, pp. 1-9.

* cited by examiner

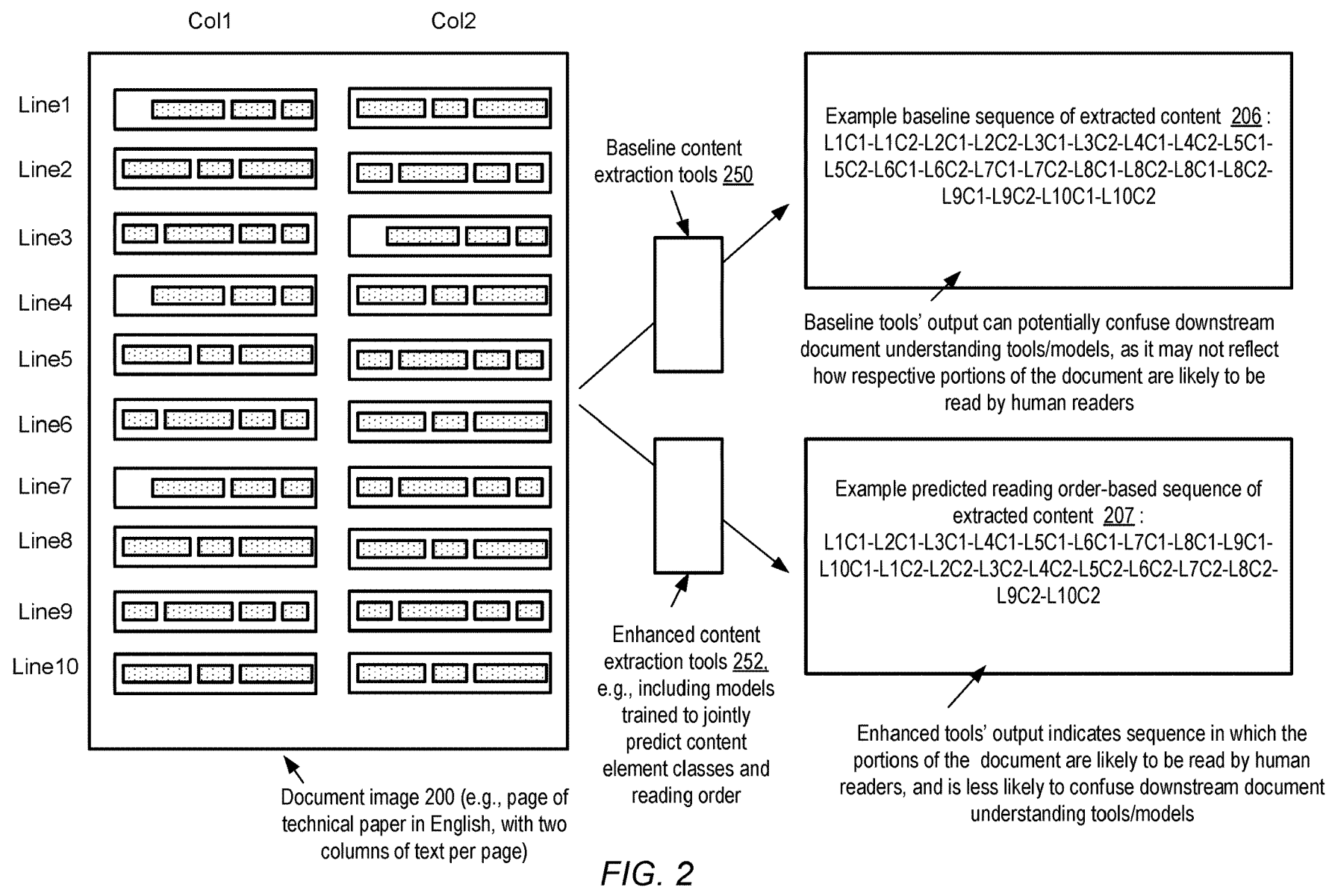

Col1

Col2

Line1

Line2

Line3

Line4

Line5

Line6

Line7

Line8

Line9

Line10

Document image 200 (e.g., page of technical paper in English, with two columns of text per page)

Baseline content extraction tools 250

Enhanced content extraction tools 252, e.g., including models trained to jointly predict content element classes and reading order Example baseline sequence of extracted content 206 : L1C1-L1C2-L2C1-L2C2-L3C1-L3C2-L4C1-L4C2-L5C1-L5C2-L6C1-L6C2-L7C1-L7C2-L8C1-L8C2-L8C1-L8C2-L9C1-L9C2-L10C1-L10C2

Baseline tools' output can potentially confuse downstream document understanding tools/models, as it may not reflect how respective portions of the document are likely to be read by human readers Example predicted reading order-based sequence of extracted content 207 : L1C1-L2C1-L3C1-L4C1-L5C1-L6C1-L7C1-L8C1-L9C1-L10C1-L1C2-L2C2-L3C2-L4C2-L5C2-L6C2-L7C2-L8C2-L9C2-L10C2

Enhanced tools' output indicates sequence in which the portions of the document are likely to be read by human readers, and is less likely to confuse downstream document understanding tools/models

FIG. 2

DOCUMENT IMAGE ANALYSIS USING JOINT PREDICTION OF LAYOUT ELEMENTS AND READING ORDER

BACKGROUND

Many modern analytics applications employ pipelines of machine learning models. For example, a collection of document image analysis models may be used to identify text tokens, illustrations, and the like from document images (such as scanned pages of a technical paper), and the output of the document image analysis models may be provided as input to downstream models. The downstream models can that perform automated tasks such as summarizing the contents of the documents. The manner in which content is laid out within a document (e.g., whether a given page contains multiple columns of text or a single column) can have an impact on the sequence in which different portions of the content would typically be read by a human, and can therefore affect the interpretation of the documents required for some types of downstream models' tasks.

BRIEF DESCRIPTION OF DRAWIECS

FIG. 2 illustrates an example scenario in which reading order of content elements identified within a document image may impact interpretation of the image by downstream document understanding tools, according to at least some embodiments.

Figure 1:
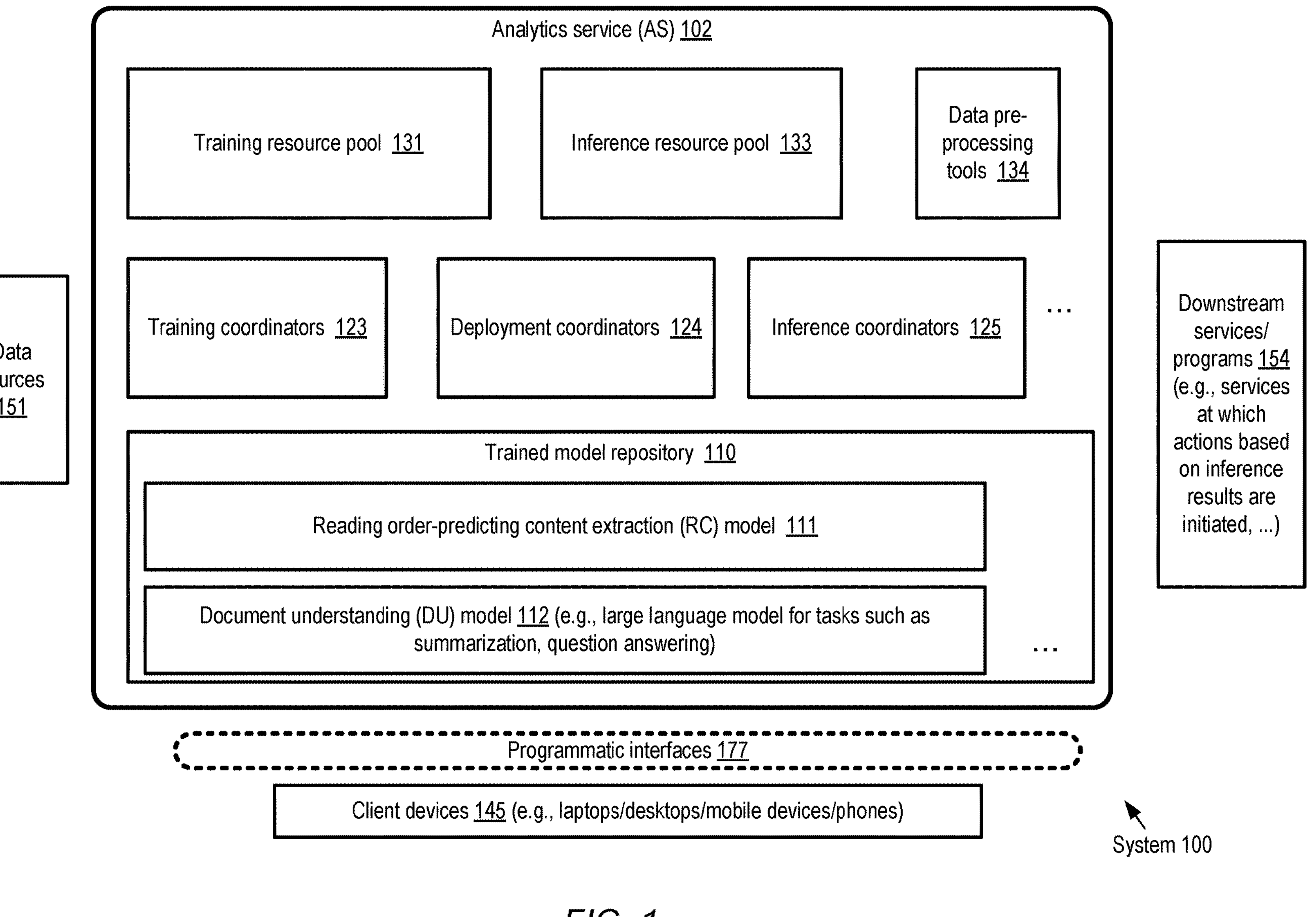
FIG. 1 illustrates an example system environment in which machine learning models that jointly predict reading order and content classes of layout elements within document images may be trained and executed at an analytics service, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the terms "set" and "collection" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

DETAILED DESCRIPTION

The present disclosure relates to methods and apparatus for training and executing a machine learning model that jointly predicts both the content classes (such as lists, tables, text paragraphs, etc.) of layout elements identified within document images, and the order in which the layout elements would typically be read. In text-only data (such as sentences, paragraphs and the like) provided as input to machine learning models, there is typically no ambiguity about the sequence in which the tokens of the text should be analyzed in the models. In contrast, the layout of content within images of documents such as technical papers, newspapers, magazines and the like can be somewhat more complex, leading to the possibility of ambiguity during automated analysis—for example, some documents can include multiple columns of text, with illustrations or tables intermingled with the text, headers and footers in the pages, and so on. Analyzing the content of such documents is relatively easy for human beings, because a human being can usually discern the order in which the authors of the document intended various portions of the content to be read, and the human being can skip over some less important portions of the document (such as repeated headers/footers)

or scrutinize some portions (such as footnotes, references and the like) separately from the main content of the document. In some conventional automated document analysis systems, a set of content extraction tools (e.g., comprising one or more machine learning models) is first used to extract content elements (such as lines of text) from an image of a document. The extracted content elements can then be provided as input to document understanding tools (such as large language models or other generative artificial intelligence (GAI) models) or other downstream tools that can process the extracted content elements to perform tasks such as summarization, question-answering and the like. However, if the extracted content elements happen to be provided to the document understanding tools in a sequence which differs from the sequence in which the content elements would be read by a human being, this can potentially lead to errors.

To help avoid such errors, a machine learning model that is trained to jointly predict the content types and positions (e.g., bounding boxes) of layout elements (such as titles, headers, footers, collections of contiguous text tokens, lists, etc.) within input document images, and also the expected reading order of the layout elements can be utilized. Such a model can be referred to as a reading order-predicting content extraction (RC) model. A combined loss function which aggregates losses associated with predictions of the content types and losses associated with prediction of the reading order can be used during the training of the RC model. Using a single machine learning model to predict the reading order as well as the content classes and positions can be more efficient (in terms of the total amount of computation required), and less likely to lead to errors, than if a separate model were used for predicting the reading order. The jointly-trained machine learning model can comprise a number of neural network sub-models, such as a feature extraction backbone, an encoder, a decoder, and/or a set of feed-forward networks used for making the final predictions.

In some cases, a multi-phase training methodology can be used for an RC model. In a first phase, a data set comprising document images whose layout elements' content classes are labeled can be used to teach the RC model to predict classes and positions of the layout elements, without teaching the RC model to predict reading order. The first training phase can be referred to as pre-training. In a second phase of training, a second data set (which can be much smaller than the first data set) in which the reading order of the layout elements is included in the labels may be used to enable the RC model (which has already learned to predict layout element content types and positions) to also learn to predict reading order. The second phased of training can be referred to as fine tuning the RC model. In some cases a single training phase can be used instead of a pre-training phase followed by a fine tuning phase.

After the RC model has been trained, it can be deployed, e.g., at an analytics service of a cloud provider network or cloud computing environment where the RC model was trained, as part of a larger document analysis pipeline. The output of the RC model, including the predicted reading order for various layout elements identified within input document images, can be provided as input to large language models or other document understanding tools of the pipeline. Alternatively, the predicted reading order and layout element classes can be provided in a response to an invocation of an application programming interface or API by a program, instead of being provided to downstream tools of a pipeline.

As one skilled in the art will appreciate in light of this disclosure, certain embodiments may be capable of achieving various advantages, including some or all of the following: (a) enhancing the quality of results obtained from automated document analysis pipelines, and/or (b) reducing the amount of time, computing and other resources that may otherwise be required to perform many types of common document-driven business workflows, such as workflows involving loans, expense management, compliance with regulations, organization-specific policy enforcement, and the like.

According to some embodiments, a system may comprise one or more computing devices. The computing devices may include instructions that upon execution on or across the one or more computing devices cause the one or more computing devices to obtain a labeled data set which indicates, with respect to individual ones of a plurality of example document images, (a) a respective set of layout elements within the example document image and (b) a reading order for at least some layout elements of the respective set. Depending on the nature of the document whose image (e.g., scan or photograph) is being used as an example in the labeled data set, the layout elements may include, among others, titles, section headings, section headers, page headers, footers, text token groups or chunks, illustrations/diagrams, captions, page numbers etc. The reading order may indicate a sequence in which at least some layout elements of the set are expected to be read by humans accessing the example document image. In some cases, for example, a human labeler may be assigned the task of labelling a document image. Such a human labeler may read the contents of the example document image, and assign respective numbers to various layout elements of the document, indicating the order in which then labeler read the elements, with "1" being assigned to the first layout element read by the labeler, "2" being assigned to the second layout element, and so on. Such numbers may then be included as reading order labels for the layout elements, under the assumption that the order in which the labeler read the elements is likely to match the order in which other people are likely to read the elements. In some embodiments, the set of labels corresponding to a given layout element may for example include (a) a position indicator, such as a bounding box in which the position of the layout element within the document image is expressed as x and y coordinates on a virtual grid superimposed on the document image (b) a content class of the layout element (e.g., whether the layout element is a title, a section heading etc.) and (c) a reading order indicator (e.g., an integer). In at least some embodiments, an indication of the labeled data set (e.g., a data source from which the labeled data set can be accessed) may be provided via programmatic interfaces of an analytics service or machine learning service of a cloud provider network, e.g., by a client or customer of such a service.

Using the labeled data set and a combined loss function, a machine learning model may be trained (e.g., using cloud provider network resources) in various embodiments to predict, with respect to a particular document image which is not in the labeled data set, at least (a) respective content classes of a plurality of layout elements of the particular document image and (b) a reading order for at least some layout elements of the particular document image. In some embodiments, the machine learning model may include one or more neural network based transformer sub-units or modules. In at least one embodiment, the combined loss function may aggregate or combine at least (a) a first loss associated with prediction of the respective content classes and (b) a second loss associated with prediction of the reading order. In some embodiments, a third loss associated with predictions of the positions or bounding boxes of the layout elements may also be aggregated. A trained version of the model may be stored, e.g., at a repository of trained models of an analytics service at which the model was trained. In some cases, the labeled data set and the combined loss function may be used to further train a version of the machine learning model that has already been partially trained or pre-trained to extract and classify layout elements from document images.

The fully trained or fine-tuned version of the model may then be used for inference in various embodiments. In response to a request indicating a document image which is to be analyzed, a reading order predicted by the trained version with respect to at least some layout elements identified within the document image may be provided as input to an automated document understanding tool such as a GAI model or LLM. A document understanding task, such as summarization of contents of the document image, may be performed by the automated tool, e.g., in response to a text prompt in various embodiments using the predicted reading order. At the automated tool, the contents of the document image may be processed or analyzed in the predicted reading order. In some embodiments, an inference request may specify a target set of content classes for whose instances or occurrences a reading order is to be predicted. For example, the inference request may specify that the reading order of various instances of section headers and text chunks is to be predicted, thereby indicating that the requester of the inference is not interested in predictions of reading order for content such as page headers, page footers, illustrations, and the like.

The machine learning model which has learned to predict reading order of extracted layout elements, along with the content classes and positions of the layout elements, may be referred to as a reading order-predicting content extraction (RC) model. The RC model may comprise various sub-models or sub-units in some embodiments, with at least some of the sub-models comprising respective neural networks. For example, in one embodiment the RC model may comprise a vision transformer backbone which generates hierarchical feature maps from document images. The generation of such hierarchical feature maps may comprise, for example, applying self-attention to non-overlapping subsets of an input document image at one layer of the backbone, and merging neighboring subsets of the non-overlapping subsets at another layer. In at least one embodiment, the RC model may include an encoder (such as a deformable transformer encoder) to which the output of the backbone is provided as input, and a decoder (such as a deformable transformer decoder) which consumes the output of the encoder. In one embodiment, the RC model may include one or more feed-forward networks (FFNs) to which the output of the decoder is provided as input, with the output of the FFNs comprising the predictions of the RC model as a whole.

In some embodiments, the RC model may assign respective real numbers as reading order indicators (ROIs) or values/scores to at least some of the layout elements identified within a document. For example, for a document image in which four layout elements L1, L2, L3 and L4 have been identified, L1 may be assigned an ROI 2.3, L2 may be assigned an ROI 4.1, L3 may be assigned an ROI 0.8, and L4 may be assigned an ROI 3.3. The proposed reading order may corresponding to increasing ROIs—e.g., L3 may be followed by L1, L4 and L2 in that sequence. In general, the difference between the ROIs of any two layout elements may be an indication of the strength or confidence of the ordering of the two layout elements—for example, because the ROI of L2 is 4.1 and the ROI of L3 is 0.8, the model predicts with a great degree of confidence that L3 should precede L2 in the reading order. In at least some embodiments, the RC or an associated post-processing layer may analyze the assigned ROIs to determine whether the difference in ROIs between various pairs of the layout elements is above a threshold. If at least some of the differences are not above the threshold, an alternative approach may be used to generate the reading order instead of relying on the RC model in one such embodiment—for example, an algorithm that uses geometry information (e.g., bounding box data of the layout elements) for the layout elements may be used to provide a reading order. Of course, it may be the case that the geometry-based algorithm also ends up predicting the same reading order as the RC model in some cases.

In at least some embodiments in which the RC model is trained and/or deployed at a service of a cloud provider network, a client of the service may indicate the specific types of content classes of interest to the client. For example, some clients whose use cases involve the analysis of patent applications or other legal documents may be interested in a different group of content classes (e.g., background sections, lists of drawings, detailed descriptions, claims, abstracts etc.) than clients whose use cases involve doctor-patient interaction summaries (e.g., health status summary, medications list, etc.). Such preferences may be taken into account during training of the RC model, and/or during processing of inference requests.

FIG. 1 illustrates an example system environment in which machine learning models that jointly predict reading order and content classes of layout elements within document images may be trained and executed at an analytics service, according to at least some embodiments. As shown, system 100 includes resources and artifacts of an analytics service (AS) 102, which may in some cases be one of a suite of network-accessible services implemented at a cloud provider network or cloud computing environment. The AS 102 may include training coordinators 123, deployment coordinators 124, and inference coordinators 125 in the depicted embodiment. The training coordinators 123 may be responsible for various phases of the training of machine learning models on behalf of customers of the AS 102, e.g., using data pre-processing tools 134 and training resource pool 131. The models may be trained, for example, in response to programmatic requests submitted by AS customers from client devices 145 to the AS via programmatic interfaces 177. The programmatic interfaces 177 may include, among others, web-based consoles, graphical user interfaces, command-line tools, application programming interfaces (APIs) and the like, and the client devices may include laptops, desktops, mobile computing devices such as tablets, phones and the like in some embodiments. At least a subset of training data for the models may be obtained from customer-specified data sources 151 in the depicted embodiment. Individual ones of the subcomponents of the AS 102 shown in FIG. 1 (such as training coordinators, deployment coordinators, data pre-processing tools and the like) may be implemented using some combination of software and hardware of one or more computing devices.

In the example scenario shown in FIG. 1, the AS 102 may provide its customers access to various machine learning models that have been trained with the help of training coordinators, with the trained versions of the models being stored at a trained model repository 110. For example, trained model repository 110 may include one or more reading order-predicting content extraction (RC) models 111, and one or more document understanding (DU) models 112 which are used for tasks such as content summarization, question answering, multi-turn conversations, and the like. Models 111 and 112 may be used in a document analysis pipeline in some embodiments, with content class information, positioning information and reading order information generated for a given document image or set of document images at an RC model being provided as input to a DU model.

According to some embodiments, a customer or client of the AS may utilize programmatic interface 177 to indicate a labeled data set which is to be used to train an RC model for the customer's document analysis use case. The labeled data set may comprise a collection of document images corresponding to the use case, such as scans or photographs of document pages, as well as corresponding labels. The labels for a given document image may indicate the positions, content classes and/or expected/anticipated reading order of various layout elements of the document image. Different clients of the AS may indicate, via the programmatic interfaces 177, respective sets of content classes which are relevant to their use cases or applications in some embodiments. Using the labeled data set indicated by a client (whose labels may identify layout elements belonging to the specific set of content classes relevant to a specific use case of the client) and a combined loss function, an RC model which can predict positions, content classes and reading orders of layout elements of unlabeled document images may be trained by training coordinators 123 using training resource pool 131 in various embodiments. The combined loss function may include terms representing losses associated with the predicted positions (e.g., expressed as bounding boxes) of layout elements, content classes of the layout elements, and/or reading order of the layout elements.

The trained version of the RC model may be stored in trained model repository 110. In some embodiments, the client may request deployment of the trained model or models to one or more execution resources of the client (e.g., including servers which are located at a premise of the client), and the trained versions of the models may be transmitted by deployment coordinators to the targeted execution resources.

For at least some types of inference requests pertaining to document image analysis, inference resource pool 133 of the AS 102 may be used. An inference coordinator 125 may receive a programmatic request from a client, indicating that a particular set of document images is to be analyzed using a specified combination of an RC model and a DU model. Alternatively, the document analysis request may simply indicate the input document image set, and an inference coordinator 125 may select the particular RC model and/or DU model which should be executed to analyze the document, e.g., based on document properties such as the client from which the document is received. The input document set may be provided to an RC model run using inference resource pool 133, and the output of the RC model (including reading order and/or content classes and positions of the extracted layout elements) may be provided to a DU model 112 which is also run using the inference resource pool to perform the tasks needed for the client's use case. In at least some embodiments, respective customized RC models and/or respective customized DU models may be trained and executed at the AS for different use cases of the same client, and/or for different use cases of different clients. For some use cases, the results of the document understanding tasks, obtained using RC and/or DU models, may be provided to one or more downstream services/programs 154, where actions may be initiated based on the results. For example, for some types of document images containing forms, if the document analysis indicates that a form was filled out incorrectly or incompletely, a request to correct the error(s) identified in the form may be sent to the form submitter.

A variety of neural network sub-units or sub-models may be included in the RC model in some embodiments. Such sub-units may include, for example, a vision transformer backbone which generates hierarchical feature maps from input document images, a transformer encoder, a transformer decoder, and/or one or more feed-forward networks. In some embodiments, region-based convolutional neural networks (R-CNNs) and/or other types of convolutional neural networks may be used instead of or in addition to one or more transformer-based sub-models.

FIG. 2 illustrates an example scenario in which reading order of content elements identified within a document image may impact interpretation of the image by downstream document understanding tools, according to at least some embodiments. A document image 200 is to be analyzed using automated tools in the depicted embodiment. The image shows two columns of text per page (assumed to be in a language similar to English, in which text is typically read from left to right), labeled Col1 and Col2. Within each column, multiple lines of text tokens may be present, such as Line1-Line10. The set of text tokens in a given line i in a given column j is represented on the right side of FIG. 2 using the format LiCj—for example, the tokens of line 1 column 2 are represented as L1C2.

A set of baseline content extraction tools 250, which does not include an RC model of the kind introduced above, may in some cases provide output listing the text token groups in an order which does not correspond to the order in which the text token groups would be expected to be read and understood by humans. Humans would normally read the lines in Col1, from the top to the bottom, before reading the lines in Col2 from top to bottom. In contrast, in a scenario in which there is very little spacing between Col1 and Col2, the output could potentially present the text tokens arranged in the example baseline sequence of extracted content 206, in which the text tokens in one line of Col1 are followed by the text tokens in the same line of Col2. This, L1C1 may be followed by L1C2, L2C1 may be followed by L2C2, and so on. Such baseline tool output can potentially confuse downstream document understanding tools/models, as the tools/models may not be able to process the content on the document in the sequence in which human readers would process the content. Because the document understanding tools/models may try to interpret the text tokens based on the order in which they appear in the input provided, the interpretation may be incorrect.

In various embodiments, enhanced content extraction tools 252, which do include an RC model of the kind introduced above, may predict the reading order of the LiCj token sets correctly. In the predicted reading order-based sequence of extracted content 207, all the lines within Col1 may be read in top-to-bottom order, and then al the lines within Col2 may be read in top-to-bottom order. Thus, L1C1 would be followed by L2C1, L3C1, etc., L10C1 would be followed by L1C2, L2C2, and so on. This order would be less likely to confuse downstream document understanding tools/models, as it may represent the intended order (from the perspective of the author or creator of the document from which document image 200 is generated) in which the words of the document were to be read. Note that for different languages and scripts, the manner in which content within a document is read may differ-some scripts may be read right to left, some languages may comprise logograms read top to bottom or bottom to top, and so on. In various embodiments, different RC models may be trained for respective languages which differ in the way content is read.

Figure 3:
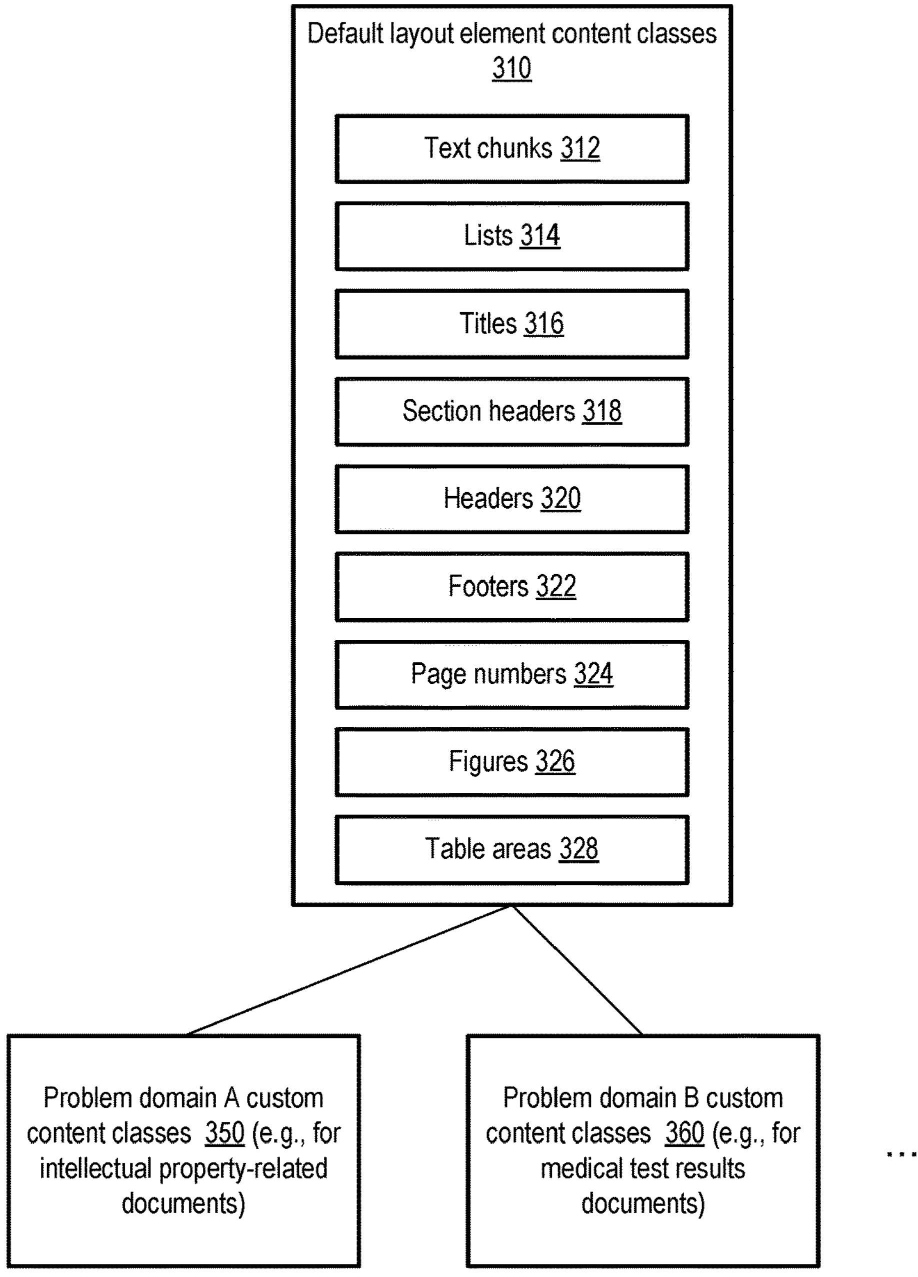
FIG. 3 illustrates an example set of default layout element content classes which may be customized for different use cases, according to at least some embodiments.

As indicated above, the classes of document image layout elements that are relevant for different applications or use cases may not be the same. In some embodiments, an analytics service similar to AS 102 of FIG. 1 may use a default set of content classes for document analysis unless clients indicate other classes. FIG. 3 illustrates an example set of default layout element content classes which may be customized for different use cases, according to at least some embodiments. Default layout element content classes 310 may be chosen at an AS because they are applicable to a broad range of documents that are typically analyzed at client request. The default classes may include text chunks 312, lists 314, titles 316, section headers 318, headers 320, footers 322, page numbers 324, figures 326 and table areas 328 in the depicted embodiment.

The AS may publish definitions of each of the content classes in some embodiments, enabling clients to determine (e.g., by submitting programmatic queries to the AS, or by viewing documentation of the AS) the kinds of content into which document image layout elements would be classified by default. A text chunk 312 may, for example, be defined as a group of text tokens which are semantically associated with one another and separated from the remainder of the text of the document. A list 314 may be defined as an indexed group of text tokens, where the indices may comprise bullets, numbers, letters, symbols etc. A title 316 may be defined as a set of text tokens semantically describing text that follows the set of text tokens. A section header 318 may be defined as a group of text tokens that is semantically related to some following paragraphs/chunks of text, but not to all the text of the document. A header 320 may be defined as a group of content located at the top of a page, which is not semantically associated with the primary content of the document, but may contain metadata such as the name of a journal from which the document image is generated, an institution or organization which published the document, and so on. A footer 322 may be defined similarly to a header, except that the footer is located at the bottom of a page. A page number 324 may comprise any text which indicates the sequencing of different pages of a document. A FIG. 326 may represent any drawing, graph or illustration that appears in a page. A table area 328 may comprise any text data which is arranged as a grid of cells.

If desired, clients of the CS may extend, modify, or replace the list of default content classes that are to be used for the analysis of their document images in various embodiments. For example, problem domain A custom content classes 350 may be specified via programmatic interfaces by one client on whose behalf intellectual property-related documents are to be analyzed, while problem domain B custom content classes 360 may be defined by another client whose use cases deal with medical test result documents. Respective RC models may be trained for each set of content classes in some embodiments. In other embodiments, a single RC which is capable of classifying and predicting reading order for multiple sets of content classes may be trained at an AS—e.g., the same RC model may be trained to predict classes and reading orders of layout elements of intellectual property documents using a set of content classes 350 and to predict classes and reading orders of layout elements of medical test results using a set of content classes 360.

Figure 4:
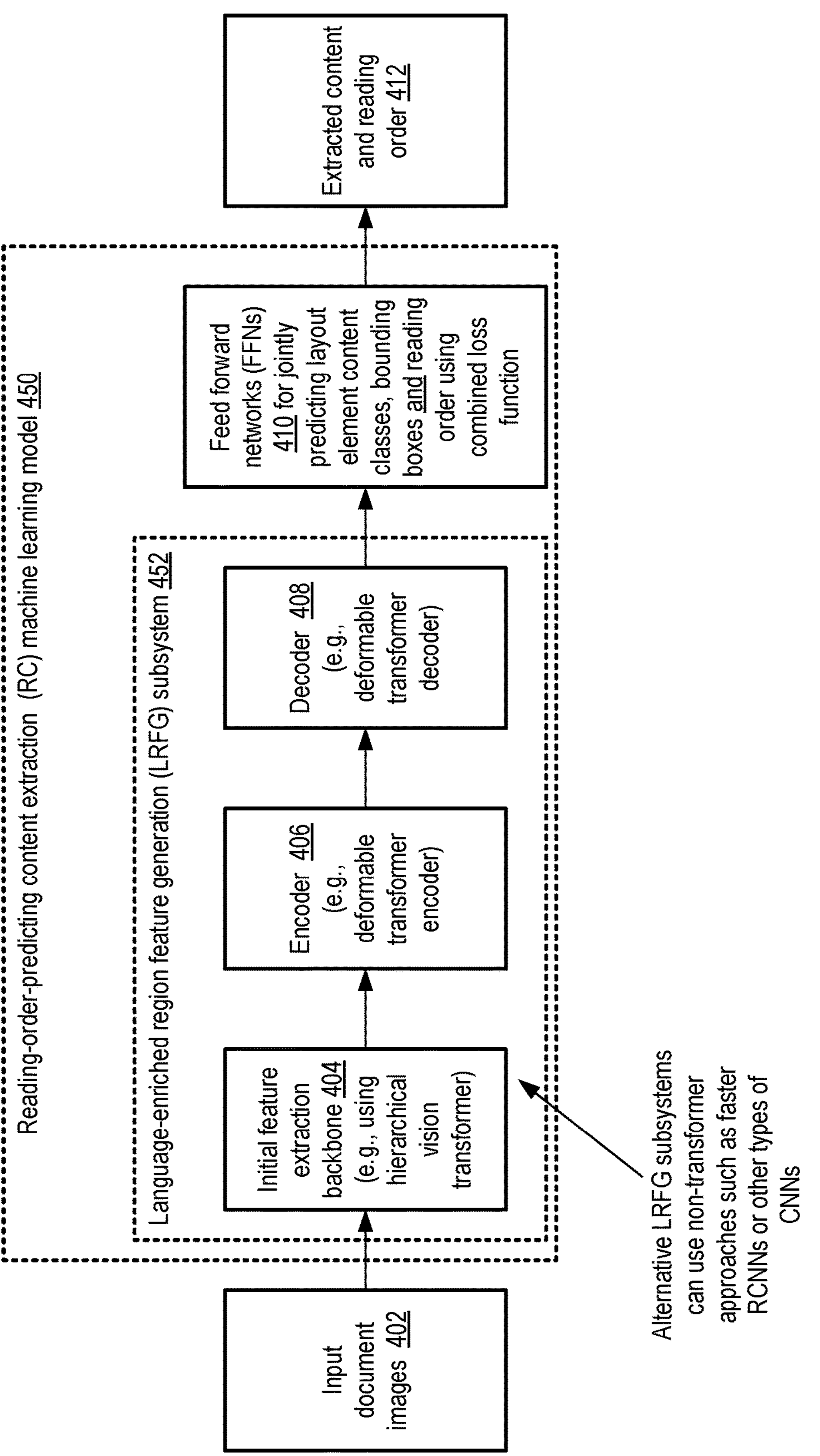
FIG. 4 illustrates an example architecture of a reading order-predicting content extraction machine learning model, according to at least some embodiments.

FIG. 4 illustrates an example architecture of a reading order-predicting content extraction machine learning model, according to at least some embodiments. In the depicted embodiment, an RC model 450 may comprise a language-enriched region feature generation (LRFG) subsystem 452, and a set of feed forward networks (FFNs) 410 that jointly predict layout element content classes, bounding boxes, and reading order for input document images 402 using a combined loss function. The combined loss function may aggregate loss terms for all three of the prediction types in some embodiments—the positions/bounding boxes of the layout elements, the content classes of the layout elements, and/or the reading order of the layout elements. The extracted content and reading order 412 may be transmitted to one or more destinations, such as a device from which an inference request specifying a document image is received.

Any of a variety of neural networks may be used at the LRFG subsystem 452 in different embodiments. In some embodiments, neural network based transformers may be used. Generally speaking, in the domain of neural network-based machine learning models, the term "transformer" is used to indicate a neural network that learns context and hence associated meaning by tracking relationships in sequential or otherwise ordered data such as the set of words in a sentence. While transformers were initially designed to analyze text-only input, they have been adapted to analyze images (e.g., by dividing the image into smaller units and treating the image as a sequence of such units); some such adapted transformers are referred to as vision transformers. In the embodiment depicted in FIG. 4, LRFG subsystem 452 may comprise an initial feature extraction backbone 404, which may utilize a hierarchical vision transformer. From a given input document image 402, a hierarchical feature map may be generated at one layer of the backbone by applying a technique referred to as self-attention to non-overlapping subsets of sub-units of the document image, and merging neighboring subsets of the non-overlapping subsets in another layer. The feature maps may be provided as input to an encoder 406, such as a deformable transformer encoder in the depicted embodiment. The encoder may generate object queries from the feature maps, and provide the object queries as input to a decoder 408, such as a deformable transformer decoder. In some embodiments, one or more cross-attention layers may be used at the decoder to attend to the encoder output. The output of the decoder 408 may be provided as input to the FFNs 410. In some embodiments in which a transformer encoder and decoder are used, a bipartite matching technique and a set-based loss may be used to detect the classes of the layout elements. In one embodiment, augmented sampling techniques adapted from deformable convolution networks may be used in the LRFG subsystem 452, hence the use of the term "deformable" to describe the encoder and/or the decoder. In some implementations, positional embeddings may be updated after each decoder layer, and weights of early layers may be updated with gradients of later layers (a technique referred to as "look forward twice"). In some embodiments, while query positional embeddings may be received at the decoder from the encoder, query embedding may be learned at the decoder. For faster convergence, in at least some embodiments, noisy bounding boxes and noisy classes (e.g. bounding boxes and classes which include noise added to the corresponding ground truth elements) may be used during training of the RC model. In some implementations, an additional regression head or layer may be used for prediction of the reading order.

In some embodiments, other types of neural networks than transformers may be used for some portions or all of the LRFG subsystem 452. For example, any of several kinds of region based convolutional neural networks or RCNNs, such as faster RCNNs or masked RCNNs, may be used in some embodiments.

Figure 5:
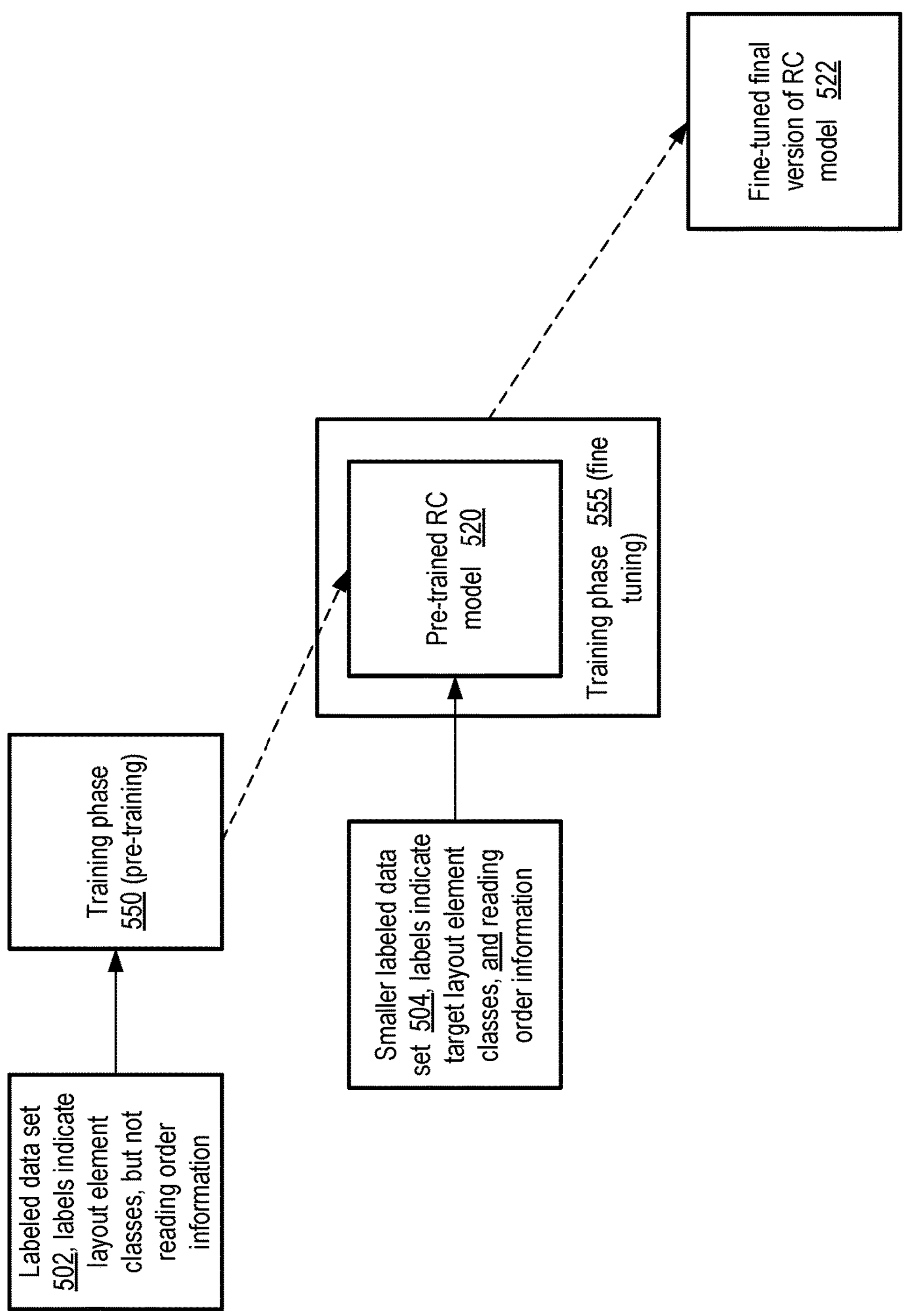
FIG. 5 illustrates an example multi-phase training methodology for order-predicting content extraction machine learning models, according to at least some embodiments.

FIG. 5 illustrates an example multi-phase training methodology for order-predicting content extraction machine learning models, according to at least some embodiments. In a first training phase 550, which may be referred to as pre-training, a labeled data set 502 which does not include reading order information but does indicate a the content classes and positions of layout elements which are present in document images may be used to prepare a pre-trained RC model 520. The pre-trained version of the RC model may thereby be able to predict content classes, selected from a particular set of candidate content classes represented in the labels of labeled data set 502, for various layout elements present in input document images.

In a second training phase 555, a smaller labeled data set 504, whose labels include reading order information in addition to content classes and positions of layout elements in document images, may be provided as input to the pre-trained RC model 520. The pre-trained RC model may thereby further learn to predict reading order jointly with content classes and positions of layout elements. A combined loss function which aggregates respective loss terms related to layout element position, content classes and reading order may be used during training phase 555, which may also be referred to as a fine tuning phase. After training phase 555 is completed, a fine-tuned final version of the RC model 522 may be stored. The fine-tuned version may later be employed to respond to inference requests.

In at least one embodiment, the set of layout element classes for which labels are included in data set 504 may differ from the set of layout element classes for which labels are included in data set 502. For example, data set 502 may comprise labels from a default set of content classes of an analytics service, while data set 504 may comprise labels for a target set of classes which has been chosen specifically for an application or use case of a client on whose behalf the fine tuning is performed. As such, multiple fine-tuned versions of the RC model may be prepared in some embodiments, each customized for a particular use case or client, and each fine-tuned with a different labeled data set. Note that in some embodiments, the pre-training step may be skipped, and only a single phase of training may be conducted, using a data set which includes labels for layout element positions, content classes and reading order.

Figure 6:
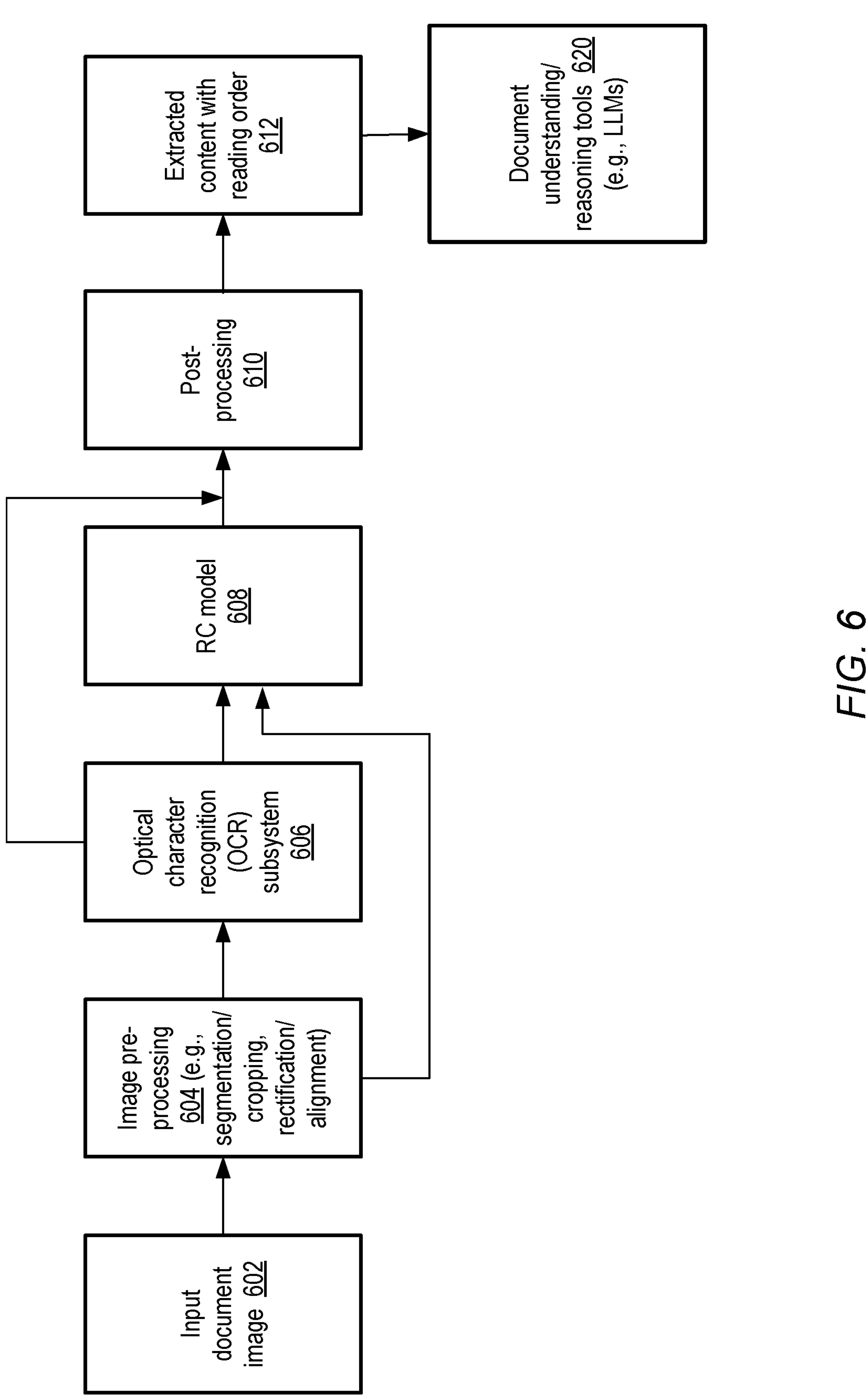
FIG. 6 illustrates an example document image analysis pipeline in which optical character recognition (OCR) subsystem output may be consumed as input by a reading order-predicting content extraction machine learning model, according to at least some embodiments.

FIG. 6 illustrates an example document image analysis pipeline in which optical character recognition (OCR) subsystem output may be consumed as input by a reading order-predicting content extraction machine learning model, according to at least some embodiments. An input document image 602 submitted for analysis may first be passed through an image pre-processing stage 604 of the pipeline. In the image pre-processing stage, the document image may be cropped if needed, rectified or straightened if the original image happened to comprise text at an angle instead of being aligned horizontally or vertically with respect to the boundaries of the document image, and so on.

The pre-processed image may be provided as input to an optical character recognition (OCR) subsystem 606 in the depicted embodiment. The OCR subsystem, which may itself comprise some number of machine learning models, may extract text characters and/or tokens from the document image, and identify bounding boxes for sets of characters or sets of tokens.

In some embodiments, an RC model 608 similar to the RC models introduced above may consume both the OCR subsystem output and the pre-processed image. In other embodiments, the input to the RC model may comprise only the pre-processed image, and OCR subsystem output may not be provided as input to the RC model. In at least some embodiments, in a post-processing stage 610 of the pipeline, both the OCR subsystem output and the RC model output may be analyzed. If there are discrepancies between the OCR subsystem output and the output of the RC model, for example if there are text token groups included in the OCR output which are not included among the classified layout elements generated by the RC model, in some embodiments another machine learning model may be used to try to reconcile the differences. Such a reconciliation model may, for example, compare the predicted positions of the layout elements (generated by the RC model) with the positions of the text token groups (generated by the OCR subsystem) and determine whether the text tokens should be included in the layout elements. In some cases, if discrepancies cannot be resolved using models or other automated post-processing tools, the input document image and the results obtained from the RC model and the OCR subsystem may be transmitted to an auditor for manual review. In at least some embodiments, the post-processing stage may include an analysis of the reading order predictions, using a technique similar to that shown in FIG. 7.

Assuming that no discrepancies or other types of errors are detected in post-processing stage 610 (or any discrepancies/errors that were detected are resolved), the extracted content with reading order information 612 may be transmitted to one or more destinations. In some cases, such a destination may comprise one or more document understanding/reasoning tools 620, such as large language models (LLMs). A language model is a type of model that is typically trained on textual data to generate coherent and contextually relevant text, although some language models may be trained using images (or other types of input) as well as text input. A "large" language model refers to a language model that has been trained on an extensive dataset and has a high number of parameters, enabling them to capture complex language patterns and perform a wider range of tasks. Large language models are designed to handle a wide range of natural language processing tasks, such as text completion, translation, summarization, and even conversation. The specific parameter count required for a model to be considered a "large" language model can vary depending on context and technological advancements. However, traditionally, large language models have millions to billions of parameters. Large language models can also be referred to as foundation models, as they can be used as the foundations for numerous other models that have been fine-tuned for different types of tasks in various problem domains. The document understanding/reasoning tools 620 in the depicted embodiment may utilize the reading order information generated by the RC model to perform tasks on behalf of the submitter of the input document image and a text prompt pertaining to the input document image (such as a prompt to summarize the input document image, or to answer specific questions about the input document image). The contents of the input document image may be examined, analyzed or processed by the document understanding/reasoning tools in the predicted reading order in various embodiments. If the contents were to be examined, analyzed or processed in a different order which does not correspond to the sequence in which the content would typically not be read by a human, this could potentially lead to confusion or the introduction of hallucinations in the output of the tools in at least some embodiments.

Figure 7:
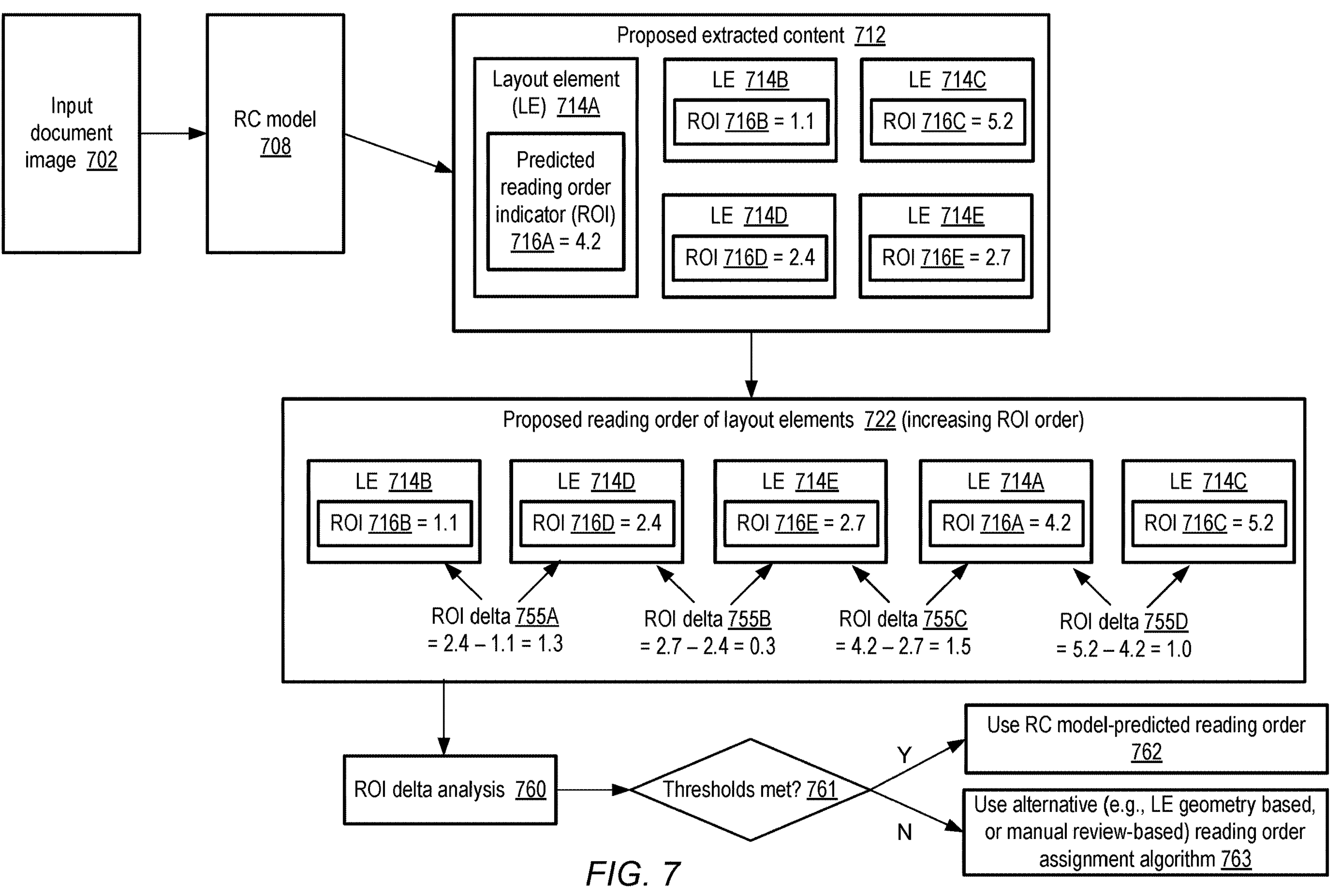
FIG. 7 illustrates an example technique in which respective real-valued reading order indicators may be generated by a machine learning model for various layout elements of a document image, according to at least some embodiments.

FIG. 7 illustrates an example technique in which respective real-valued reading order indicators may be generated by a machine learning model for various layout elements of a document image, according to at least some embodiments. A trained RC model 708 may generate a set of proposed extracted content 712 from an input document image 702. In the example scenario shown, five layout elements (LEs) may be predicted by the RC model: LE 714A, LE 714B, LE 714C, LE 714D and LE 714E. For each layout element, a content class and a bounding box may be predicted in addition to a reading order indicator (ROI) or reading order value; the content classes and bounding boxes are not shown in FIG. 7 to avoid clutter. A predicted ROI may be expressed as a real number in the depicted example, with lower ROIs indicating earlier positions in the reading order than higher ROIs. LE 714A may be assigned an ROI 716A of 4.2, LE 714B may be assigned an ROI 716B of 1.1, LE 714C may be assigned an ROI 716C of 5.2, LE 714D may be assigned an ROI 716D of 2.4, and LE 714E may be assigned an ROI 716E of 2.7. The ROIs may be assigned, for example, at a feed-forward layer of an RC model.

The proposed reading order of the layout elements 722 (i.e., based on increasing ROIs) may place LE 714B (which has the lowest ROI among the LEs) first, followed in order by LE 714D, LE 714E, LE 714A and LE 714C. The differences between the ROIs for any given pair of LEs may represent the strength or confidence level of the RC model regarding the relative placements of the LEs within the reading order. If, after the LEs are arranged in order of increasing ROIs, the differences between the ROIs of successive LEs in that order is very small, this may indicate that the confidence level of the RC model regarding the relative order of those successive LEs is not very high in the depicted embodiment.

In at least some embodiments, for example as part of a post-processing stage of a document analysis pipeline similar to that shown in FIG. 6, an ROI delta analysis 760 may be conducted to determine whether the proposed reading order initially predicted by the RC model should be included in the final output, or whether a different reading order prediction technique should be used instead or in addition. In this analysis, the respective deltas or differences between the ROIs of successive pairs of the LEs of a document image may be computed. For example ROI delta 755A (1.3) is the difference between the ROIs of the first and second LEs in the example proposed reading order of FIG. 7, ROI delta 755B (0.3) is the difference between ROIs of the second and third LEs, ROI delta 755C (1.5) is the difference between ROIs of the third and fourth LE, and ROI delta 755D (1.0) is the difference between ROIs of the fourth and final LE. If all the deltas satisfy a threshold (e.g., if all the deltas are greater than or equal to 0.6), as determined in element 761, the RC model-predicted reading order may be used in the output provided for document image 702, as indicated in element 762. If, in contrast, at least some of the deltas do not satisfy the threshold, an alternative reading order assignment algorithm may be invoked in the depicted embodiment, as indicated in element 763. For example, an algorithm that predicts reading order based on the geometry of the bounding boxes of the LEs may be used in some implementations, or a manual review may be conducted to check whether a reviewer agrees with the RC model's reading order prediction with respect to at least those pairs of LEs whose deltas did not meet the threshold. The threshold delta value (e.g., whether a difference of 0.6 is sufficient to accept the ordering proposed/predicted by the RC model) and/or the number or fraction of the delta values that need to satisfy the threshold for the RC model's reading order to be accepted (e.g., whether all the deltas need to meet the threshold, or whether 90% of the deltas need to meet the threshold, etc.) may be considered meta-parameters of the document analysis in the depicted scenario. Such meta-parameters may be selected using knowledge base entries maintained at an AS in some embodiments, in which the parameter values that have been used successfully (e.g., with the success determined based on client feedback) for similar types of document analysis use cases in the past may be stored.

In some embodiments, instead of simply computing deltas/differences between the ROIs, other statistical metrics (such as measures of variance) associated with ROIs predicted for the layout elements may be examined to determine, based on one or more criteria, whether to use an alternative reading order assignment algorithm. In various embodiments, the particular ROI statistical metric (e.g., the difference, or a more complex metric) that should be analyzed, and/or the metric-based rules/thresholds/criteria to determine whether the ROIs by themselves are acceptable, may be indicated via programmatic interfaces of an AS by a client on whose behalf the RC model is being run for inference.

Figure 8:
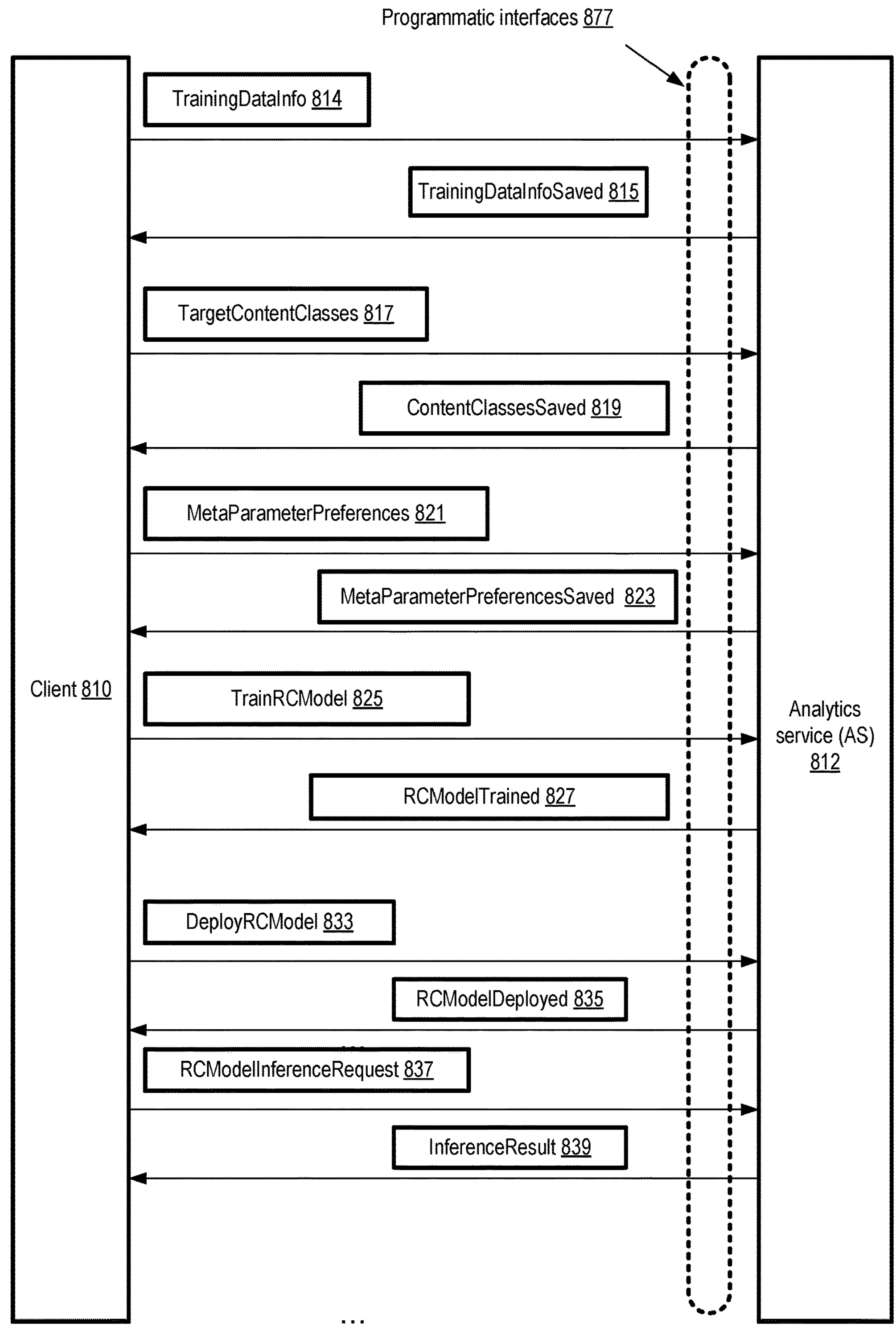
FIG. 8 illustrates example programmatic interactions between clients and an analytics service of a cloud provider network, according to at least some embodiments.

FIG. 8 illustrates example programmatic interactions between clients and an analytics service of a cloud provider network, according to at least some embodiments. One or more programmatic interfaces 877 may be implemented by an analytics service (AS) 812, similar in features and functionality to AS 102 of FIG. 1, in the depicted embodiment. Such interfaces may include, for example, a set of application programming interfaces (APIs), graphical user interfaces, command line tools, web-based consoles and the like in different embodiments. The interfaces may be used by customers or clients 810 of the AS, to submit requests and messages pertaining to the development, deployment and use of RC models and other models used for document analysis similar to those described above.

A client 810 may submit a TraniningDataInfo message 814 via the programmatic interfaces 877, indicating one or more data sources from which labeled examples (comprising document images and associated labels pertaining to layout elements within the images, including reading order information) can be obtained for various phases of training an RC model. The provided information about the data sources may be saved at a repository of the AS, and a TrainingDataInfoSaved message 815 may be sent to the client in some embodiments. In some embodiments, the client may provide information about different labeled data sets for respective training phases such as those shown in FIG. 5. In other embodiments, only a customized training data set for a fine-tuning phase may be provided by the client, while the AS may utilize a default data set for the pre-training phase of several RC models.

The content classes relevant to applications or use cases of different clients, or even to different use cases of the same client, may differ in some embodiments. In some such embodiments, a client may send a TargetContentClasses message 817 to the AS, indicating the specific content classes that are of interest to the client for analysis of their documents. The target content classes may be saved at the AS, and a ContentClassesSaved message 819 may be sent to the client. When providing inference results to the client, information (including reading order) about only those content classes which the client has indicated via the TargetContentClasses message may be included in various embodiments by the AS. In some embodiments, a respective version of an RC model may be fine-tuned for each set of target content classes specified by a client of the AS. The set of target content classes used (i.e., represented in the training data) during fine tuning may differ from the set of content classes used during pre-training in at least some embodiments. In other embodiments, the set of target content classes may be a subset of the content classes represented in the training data used during pre-training and/or fine tuning; in such scenarios, separate fine-tuned versions may not be needed for the target content classes.

In some embodiments, a client may provide values or preferences for one or more meta-parameters of the overall document analysis procedure which is to be used on the client's behalf by the AS, e.g., in the form of one or more MetaParameterPreferences messages 821. Such meta parameters may, for example, include a parameter indicating whether a specified or AS-selected pre-trained model is to be used during the training, values of post-processing parameters such as the ROI metrics/thresholds discussed in the context of FIG. 7, the kinds of models to be used for the RC (e.g., whether a particular type of backbone is preferred, or whether a particular type of transformer encoder/decoder combination is preferred, etc.), the manner in which predicted reading order is to be indicated in inference results (e.g., whether an integer reading order indicator assigned to each layout element is to be explicitly included in the output, or whether the layout elements are simply to be concatenated in reading order in the output), etc. The meta-parameter preferences may be saved at the AS, and a MetaParameterPreferencesSaved message 823 may be sent to the client in some embodiments.

A TrainRCModel request 825 may be submitted by the client in some embodiments to initiate the training of an RC model on behalf of the client. In some embodiments, parameters included in the TrainRCModel request may indicate whether a two-phase training workflow of the kind shown in FIG. 5 is to be used, or whether a single phase of training is being requested. The requested training may be initiated, and an RCModelTrained message 827 may be sent to the client after the training is completed. The training may be terminated based on any of various criteria in different embodiments—e.g., after the quality of the predictions of the RC model, as evaluated using a hold-out evaluation data set, reaches a criterion, or after a specified amount of resources have been consumed during the training.

In at least some embodiments, the client may submit a DeployRCModel request 833, indicating one or more execution resources at which a trained version of the RC model should be deployed. The execution resources may include resources of a cloud provider network at which the AS is implemented in one embodiment, such as virtual machines or compute instances acquired by the client. In other embodiments, a client may request that the trained model be deployed to servers locate at client premises, or to other devices external to the AS or the cloud provider network. After the model is deployed, an RCModelDeployed message 835 may be sent to the client.

A client may submit an RCModelInferenceRequest 837 in some embodiments, indicating a set of document images which are to be analyzed with the help of the trained RC model. The RC model may be executed with respect to the set of document images, and the predictions provided by the RC model may be transmitted via InferenceResult messages 839 to one or more destinations indicated in the inference request (e.g., downstream document analysis tools, and/or including the device from which the inference request was submitted).

Note that a different combination of programmatic interactions may be supported in some embodiments for training and using RC models than those shown in FIG. 8. For example, in one embodiment, several of the operations discussed may be performed in response to a single request instead of using separate requests, additional types of requests pertaining to terminating or deactivating deployed RC models may be supported, and so on.

Figure 9:
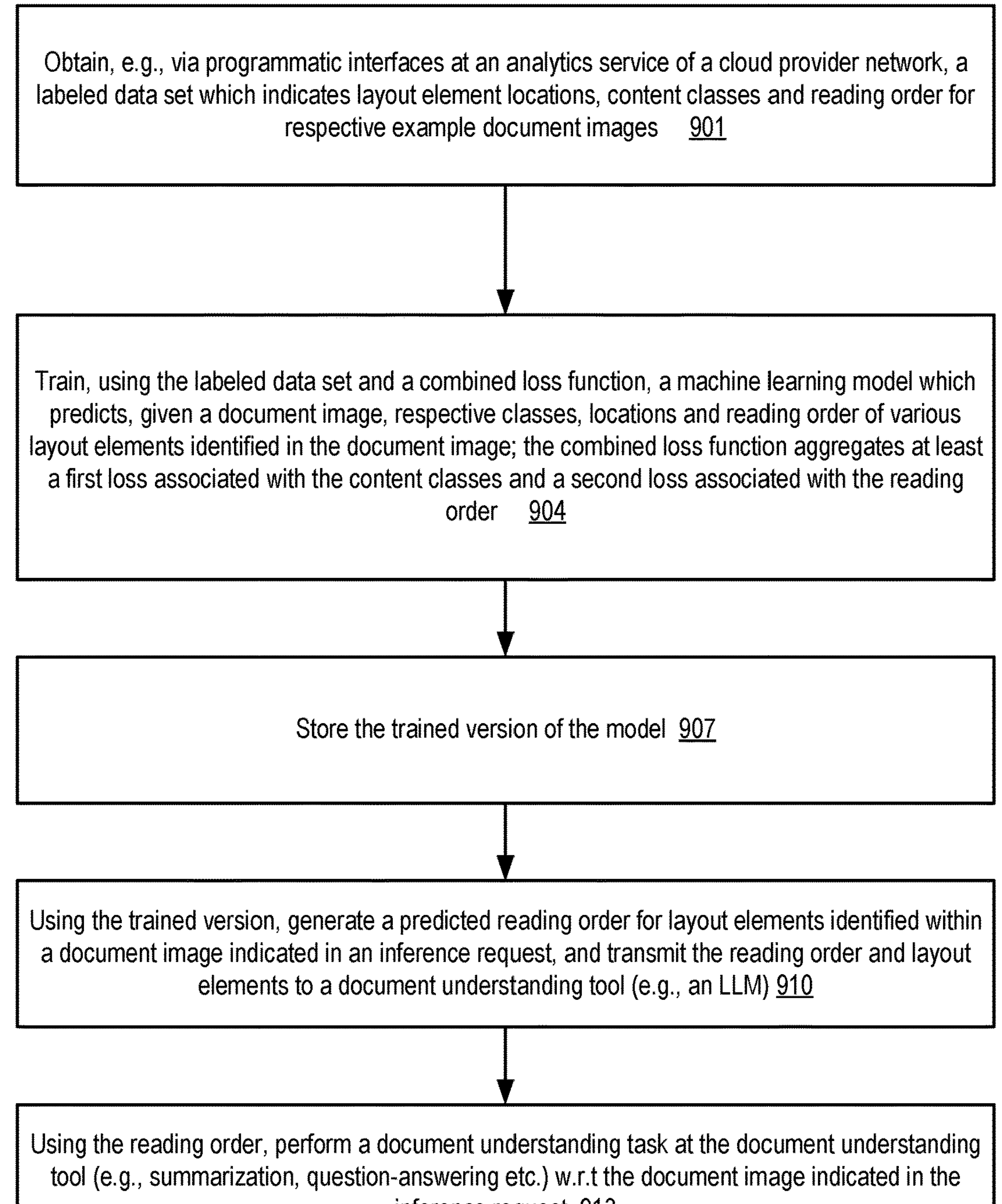
FIG. 9 is a flow diagram illustrating aspects of operations which may be performed to jointly predict content classes and reading order for layout elements of document images, according to at least some embodiments.

FIG. 9 is a flow diagram illustrating aspects of operations which may be performed to jointly predict content classes and reading order for layout elements of document images, according to at least some embodiments. As shown in element 901, a labeled data set may be obtained, e.g., via programmatic interfaces of a cloud provider network at an AS similar to AS 102 of FIG. 1. The labeled data set may indicate, corresponding to individual ones of a plurality of example document images, respective layout element locations (e.g., bounding boxes), content classes (such as some of the classes shown in FIG. 4) of the layout elements, and expected reading order (i.e., an order in which the elements are expected to be read or processed).

Using the labeled data set and a combined loss function, a machine learning model may be trained (element 904) to predict, given a document image which is not represented in the labeled data set, respective content classes, locations and reading order of various layout elements identified in the given document image. The combined loss function may aggregate at least a first loss associated with the predicted content classes and a second loss associated with the predicted reading order in various embodiments. In at least some embodiments, the combined loss function may also aggregate a third loss associated with the predicted locations or bounding boxes.

A trained version of the model may be stored in various embodiments (element 907), e.g., in a repository of trained models of the AS. Using the trained version, a predicted reading order for layout elements identified within a document image indicated in an inference request may be generated (element 910). The reading order, along with the content of the layout elements, may be provided as input to a document understanding tool such as an LLM in some embodiments.

At the document understanding tool, the predicted reading order may be used to help perform a document understanding task (such as summarization or question answering) in various embodiments with respect to the document image which was indicated in the inference request (element 913). It is noted that in various embodiments, some of the operations shown in FIG. 9 may be implemented in a different order than that shown in the figure, or may be performed in parallel rather than sequentially. Additionally, some of the operations shown in FIG. 9 may not be required in one or more implementations.

Figure 10:
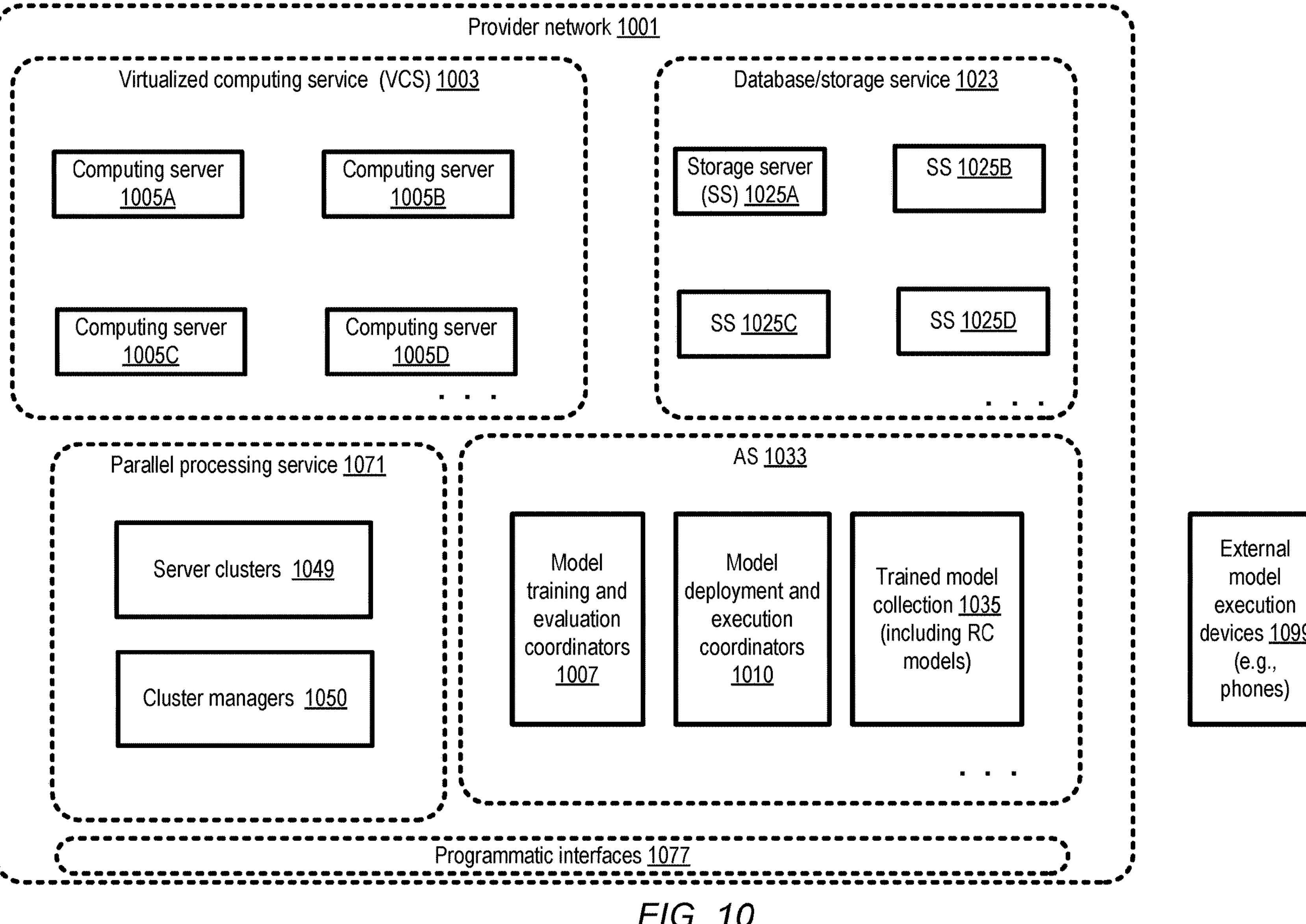
FIG. 10 illustrates an example provider network at which an analytics service providing access to reading order-predicting models may be implemented, according to at least some embodiments.

In at least some embodiments, as indicated above, an analytics service may be implemented using resources of a cloud provider network or cloud computing environment. FIG. 10 illustrates an example provider network at which an analytics service providing access to reading order-predicting models may be implemented, according to at least some embodiments. In the example shown, provider network 1001 includes several network-accessible services including an analytics service (AS) 1033, a virtualized computing service (VCS) 1003, a database/storage service 1023, and a parallel processing service 1071. The AS 1033, within which functionality similar to the functionality of AS 102 of FIG. 1 may be implemented, may include model training and evaluation coordinators 1007, model deployment and execution coordinators 1010 and a trained model collection 1035 (a group of models, including RC models of the kind introduced above, that can be deployed for execution at various devices) in the depicted embodiment. AS 1033 may also be referred to as a machine learning service (MLS) or an artificial intelligence service (AIS). In some embodiments, versions of the RC models may be deployed to external model execution devices 1099 from the provider network, such as phones, tablets, IoT devices and the like, and executed at the external devices to analyze and reason about locally-generated document images.

The AS may utilize resources at one or more other services of the provider network 1001 in some embodiments. For example, some training data sets used for the models of model collection 1035 may be stored at least temporarily at storage servers (SSs) such as SS 1025A, SS 1025B, SS 1025C or SS 1025D of the database/storage service 1023. The computing resources utilized for training and/or executing the models of model collection 1035 may include computing servers 1005A, 1005B, 1005C or 1005D of the VCS 1003. To train some models, or to pre-process input data used for training some of the models, server clusters 1049 orchestrated by cluster managers 1050 of parallel processing service 1071 may be used. Components of a given service of a provider network may thus in general utilize components of other services in the depicted embodiment. Individual ones of the services shown in FIG. 10 may implement a respective set of programmatic interfaces 1077 which can be used by external and/or internal clients (where the internal clients may comprise components of other services) in the depicted embodiment. In at least some embodiments, resources of a cloud provider network may not be required for the kinds of RC models and associated technologies introduced above; instead, for example, a standalone set of tools may be used.

A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

A cloud provider network can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g., via a virtual private network (VPN) or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

In some embodiments, compute instances of a VCS, which may be utilized for implementing a portion of the AS, may be launched within a VCS region, at an edge location of the VCS, or at a VCS extension location. An edge location (or "edge zone"), as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a local zone may have substantial capacity, for example thousands of racks or more. Some local zones may use similar infrastructure as typical cloud provider data centers. An extension location of the VCS may comprise a portion of a client-owned or customer-owned premise at which one or more data plane servers at which VCS compute instances can be launched are located. Special highly secure channels using various kinds of tunneling technologies may be established for transmitting commands (e.g., commands to launch compute instances and/or containers) from the control plane servers of the VCS (which remain at provider network data centers) to the extension location data plane servers in various embodiments.

The cloud provider network may implement various computing resources or services, which may include, in addition to the AS and the VCS, data processing service(s) (e.g., map reduce, data flow, and/or other large scale data processing techniques), data storage services (e.g., object storage services, block-based storage services, or data warehouse storage services), software container management services, and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

Various network-accessible services including the VCS and the AS may be implemented at one or more data centers, edge locations and/or extension locations of the provider network in different embodiments. The VCS may also be referred to as an elastic compute cloud service, an elastic compute service, a virtual machines service, a computing cloud service, a compute engine, or a cloud compute service. Such a service may offer compute instances (also referred to as guest virtual machines, or simply "instances") with varying computational and/or memory resources, which are managed by the service. In one embodiment, each of the virtual compute instances may correspond to one of several instance types or families. An instance type may be characterized by its hardware type, computational resources (e.g., number, type, and configuration of virtualized central processing units (VCPUs or VCPU cores), memory resources (e.g., capacity, type, and configuration of local memory), storage resources (e.g., capacity, type, and configuration of locally accessible storage), network resources (e.g., characteristics of its network interface and/or network capabilities), hardware accelerator resources and/or other suitable descriptive characteristics (such as a "burstable" instance type that has a baseline performance guarantee and the ability to periodically burst above that baseline, or a non-burstable or dedicated instance type that is allotted and guaranteed a fixed quantity of resources). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on. In some embodiments, instances of several different instance types may be launched at extension premises in response to programmatic requests from a client. Other types of network-accessible services, such as packet processing services, database services, wide area networking (WAN) services and the like may also be implemented at the cloud provider network in some embodiments.

In some embodiments, resources of the cloud provider network may be used to run software containers on behalf of clients. A software container represents a logical packaging of a software application that abstracts an application from the computing environment in which the application is executed. For example, a containerized version of a software application can include the software code and any dependencies used by the code such that the application can be executed consistently on any infrastructure hosting a suitable container engine (e.g., the Docker® or Kubernetes® container engine). Compared to virtual machines (VMs), which emulate an entire computer system, containers virtualize at the operating system level and thus typically represent a more lightweight package for running an application on a host computing system. Existing software applications can be "containerized" by packaging the software application in an appropriate manner and generating other artifacts (e.g., a container image, container file, or other configurations) used to enable the application to run in a container engine. The orchestration of such containerized applications may be conducted by a container management service or a container orchestration service of the provider network.

The traffic and operations of the cloud provider network (or individual services of the cloud provider network, including the AS) may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a VCS) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

Figure 11:
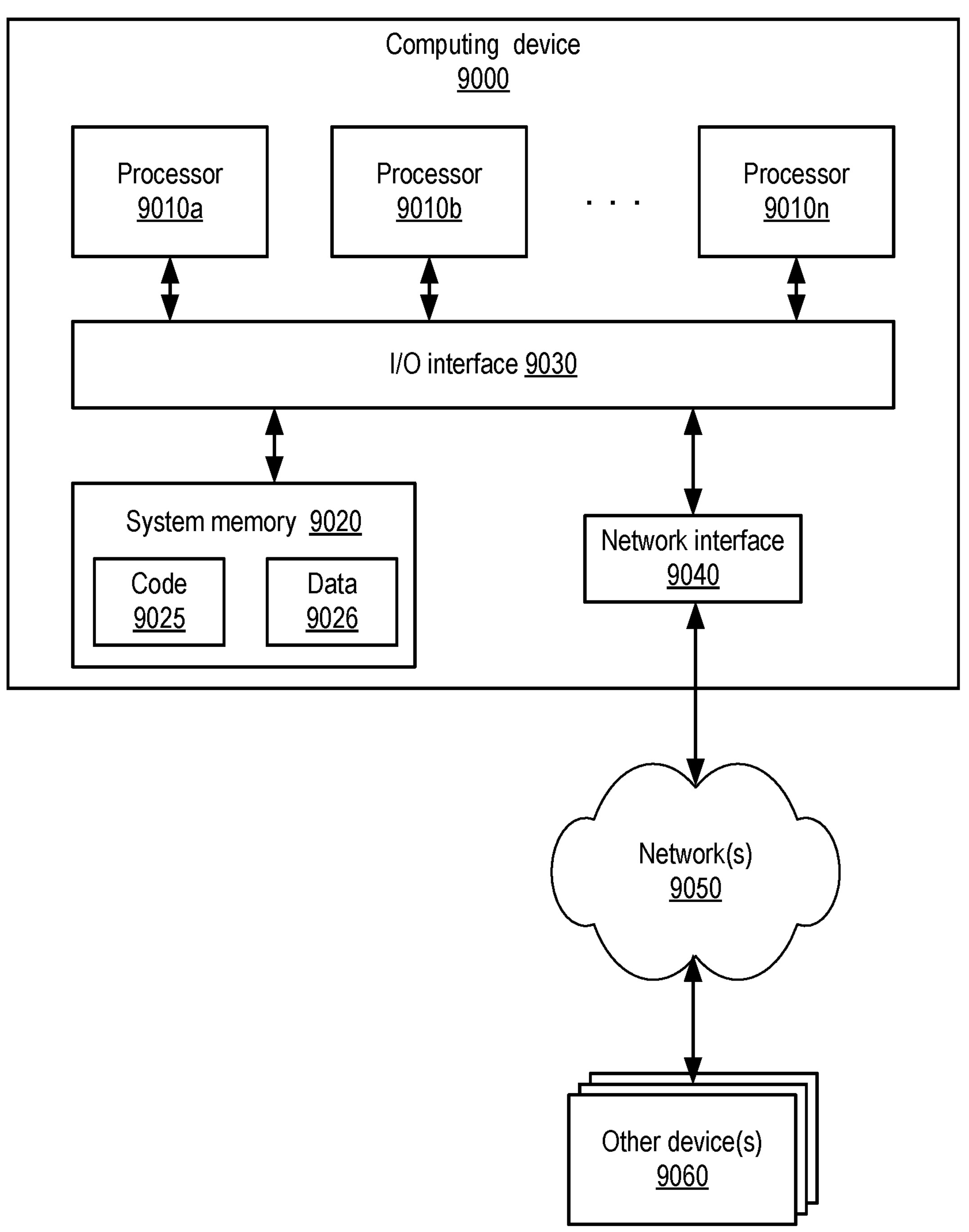
FIG. 11 is a block diagram illustrating an example computing device that may be used in at least some embodiments.

In at least some embodiments, a server that implements the types of techniques described herein (e.g., including the described functionality of analytics services and/or other services of a cloud provider network) may include a general-purpose computer system that includes or is configured to access one or more computer-accessible media. FIG. 11 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses (including hardware accelerators of various kinds), such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 10, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 10. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:

one or more computing devices;

wherein the one or more computing devices include instructions that upon execution on or across the one or more computing devices cause the one or more computing devices to:

obtain a labeled data set which indicates, with respect to individual ones of a plurality of example document images, (a) a respective set of layout elements within the example document image and (b) a reading order for at least some layout elements of the respective set of layout elements, wherein the reading order indicates a sequence in which at least some layout elements of the respective set are expected to be read by humans accessing the example document image;

train, using the labeled data set and a combined loss function, a first machine learning model to predict, with respect to a particular document image which is not in the labeled data set, (a) respective content classes of a plurality of layout elements of the particular document image and (b) a particular reading order for at least some layout elements of the particular document image, wherein the first machine learning model comprises one or more neural network transformer sub-units, and wherein the combined loss function aggregates at least (a) a first loss associated with prediction of the respective content classes and (b) a second loss associated with prediction of the particular reading order;

store the first machine learning model;

transmit, to an automated document understanding tool, in response to a request indicating that a first document image is to be analyzed, an indication of a first reading order predicted by the first machine learning model for at least some layout elements identified within the first document image; and perform, at the automated document understanding tool, a document understanding task based at least in part on processing one or more layout elements of the first document image in the first reading order.

2. The system of claim 1, wherein the first machine learning model comprises one or more of: (a) a vision transformer backbone, (b) a transformer encoder or (c) a transformer decoder.

3. The system of claim 1, wherein to train the first machine learning model, the one or more computing devices include further instructions that upon execution on or across the one or more computing devices further cause the one or more computing devices to:

provide, as input to the first machine learning model, output generated by an optical character recognition (OCR) subsystem with respect to individual ones of the example document images.

4. The system of claim 1, wherein the one or more computing devices include further instructions that upon execution on or across the one or more computing devices further cause the one or more computing devices to:

identify a second machine learning model which has been pre-trained to classify layout elements of document images into a first set of candidate content classes, and wherein, to train the first machine learning model, the labeled data set is provided as input to the second machine learning model.

5. The system of claim 1, wherein the one or more computing devices include further instructions that upon execution on or across the one or more computing devices further cause the one or more computing devices to:

receive, via one or more programmatic interfaces at a network-accessible service of a cloud computing environment, a model training request from a client, wherein the first machine learning model is trained in response to the model training request.

6. A computer-implemented method, comprising:

obtaining a labeled data set which indicates, with respect to individual ones of a plurality of example document images, (a) a respective set of layout elements within the example document image and (b) a reading order for at least some layout elements of the respective set of layout elements;

training, using the labeled data set and a combined loss function, a first machine learning model to predict, with respect to a particular document image which is not in the labeled data set, (a) respective content classes of a plurality of layout elements of the particular document image and (b) a particular reading order for at least some layout elements of the particular document image, wherein the combined loss function aggregates at least (a) a first loss associated with prediction of the respective content classes and (b) a second loss associated with prediction of the particular reading order; and in response to an inference request indicating a first document image, generating, using at least the first machine learning model, an indication of a first predicted reading order for at least some layout elements identified within the first document image.

7. The computer-implemented method of claim 6, further comprising:

identifying a second machine learning model which has been pre-trained to classify layout elements of document images into a first set of candidate content classes, wherein said training the first machine learning model comprises providing the labeled data set as input to the second machine learning model.

8. The computer-implemented method of claim 6, wherein the first machine learning model comprises a vision transformer backbone which generates feature maps from document images.

9. The computer-implemented method of claim 8, further comprising:

in response to the inference request, generating a hierarchical feature map from the first document image, wherein said generating comprises (a) applying, at a first layer of the vision transformer backbone, self-attention to non-overlapping subsets of the first document image and (b) merging neighboring subsets of the non-overlapping subsets in a second layer of the vision transformer backbone.

10. The computer-implemented method of claim 6, wherein the first machine learning model comprises a transformer encoder to which feature maps generated from document images are provided as input.

11. The computer-implemented method of claim 6, wherein the first machine learning model comprises a transformer decoder to which attention queries generated by an encoder of the first machine learning model are provided as input.

12. The computer-implemented method of claim 6, further comprising:

transmitting the indication of the first predicted reading order to a language model; and utilizing, at the language model, the first reading order to generate a response to a text prompt pertaining to at least the first document image.

13. The computer-implemented method of claim 6, further comprising:

in response to another inference request indicating a second document image, generating, using at least the first machine learning model, a second predicted reading order for a plurality of layout elements of the second document image including a first layout element and a second layout element, wherein in the second predicted reading order, the first layout element is placed before the second layout element based at least in part on a determination that a first reading order indicator assigned by the first machine learning model to the first layout element is less than a second reading order indicator assigned by the first machine learning model to the second layout element;

determining that a statistical metric associated with the first reading order indicator and the second reading order indicator satisfies a criterion; and in response to said determining, executing a geometry based algorithm to determine whether the second predicted reading order is to be included in a response to the other inference request.

14. The computer-implemented method of claim 6, wherein during said training, the respective content classes are selected from a set of content classes which includes one or more of: text chunks, lists, titles, headers, footers, page numbers, figures or table areas.

15. The computer-implemented method of claim 6, further comprising:

receiving, via one or more programmatic interfaces, an indication of a set of target content classes into which at least some layout elements of document images are to be classified; and in response to the inference request indicating the first document image, predicting, using at least the first machine learning model, classes selected from the set of target content classes for at least some layout elements identified within the first document image.

16. One or more non-transitory computer-accessible storage media storing program instructions that when executed on or across one or more processors cause the one or more processors to:

obtain a labeled data set which indicates, with respect to individual ones of a plurality of example document images, (a) a respective set of layout elements within the example document image and (b) a reading order for at least some layout elements of the respective set;

train, using the labeled data set and a combined loss function, a first machine learning model to predict, with respect to a particular document image which is not in the labeled data set, (a) respective content classes of a plurality of layout elements of the particular document image and (b) a reading order for at least some layout elements of the particular document image, wherein the combined loss function aggregates at least (a) a first loss associated with prediction of the respective content classes and (b) a second loss associated with the reading order; and in response to an inference request indicating a first document image, generate, using at least the first machine learning model, a first predicted reading order for at least some layout elements identified within the first document image.

17. The one or more non-transitory computer-accessible storage media of claim 16, storing further program instructions that when executed on or across the one or more processors further cause the one or more processors to:

identify a second machine learning model which has been pre-trained to classify layout elements of document images into a first set of candidate content classes, wherein said training the first machine learning model comprises providing the labeled data set as input to the second machine learning model.

18. The one or more non-transitory computer-accessible storage media of claim 16, wherein the first machine learning model comprises one or more of: (a) a vision transformer backbone, (b) a transformer encoder or (c) a transformer decoder.

19. The one or more non-transitory computer-accessible storage media of claim 16, wherein the first machine learning model comprises one or more convolutional neural networks.

20. The one or more non-transitory computer-accessible storage media of claim 16, storing further program instructions that when executed on or across the one or more processors further cause the one or more processors to:

transmit the indication of the first predicted reading order to a second machine learning model; and utilize, at the second machine learning model, the first predicted reading order to generate a response to a text prompt pertaining to at least the first document image.

* * * * *